(12) United States Patent
Martch

(10) Patent No.: US 10,091,676 B2
(45) Date of Patent: Oct. 2, 2018

(54) SIGNAL MEASUREMENT USING PAIRED REMOTE DEVICE

(71) Applicant: EchoStar Technologies L.L.C., Englewood, CO (US)

(72) Inventor: Henry Gregg Martch, Parker, CO (US)

(73) Assignee: DISH Technologies L.L.C., Englewood, CO (US)

(*) Notice: Subject to any disclaimer, the term of this patent is extended or adjusted under 35 U.S.C. 154(b) by 687 days.

(21) Appl. No.: 14/275,244

(22) Filed: May 12, 2014

(65) Prior Publication Data

US 2015/0327092 A1    Nov. 12, 2015

(51) Int. Cl.
- *H04W 24/08* (2009.01)
- *H04W 4/80* (2018.01)
- *H04N 17/04* (2006.01)
- *H04N 21/24* (2011.01)
- *H04N 21/41* (2011.01)
- *H04N 21/422* (2011.01)

(Continued)

(52) U.S. Cl.
CPC ............ *H04W 24/08* (2013.01); *H04B 17/20* (2015.01); *H04B 17/318* (2015.01); *H04N 5/4403* (2013.01); *H04N 17/04* (2013.01); *H04N 21/2408* (2013.01); *H04N 21/4126* (2013.01); *H04N 21/42207* (2013.01); *H04N 21/42209* (2013.01); *H04N 21/44209* (2013.01); *H04N 21/6547* (2013.01); *H04N 21/6582* (2013.01); *H04W 4/80* (2018.02); *H04B 17/23* (2015.01); *H04B 17/24* (2015.01); *H04B 17/27* (2015.01); *H04N 2005/441* (2013.01); *H04N 2005/4407* (2013.01)

(58) Field of Classification Search
CPC ..... H04W 24/08; H04B 17/20; H04N 5/4403; H04N 21/42207
USPC ...................................... 324/96, 76.11, 76.62
See application file for complete search history.

(56) References Cited

U.S. PATENT DOCUMENTS 5,793,214 A * 8/1998 Wakamatsu ......... G01N 27/023
                                                        324/127
6,216,266 B1   4/2001 Eastman et al.
(Continued)

FOREIGN PATENT DOCUMENTS

EP           1404041 A1      3/2004

OTHER PUBLICATIONS

International Search Report and Written Opinion for PCT/US2015/026603 dated Jul. 14, 2015 (14 pages).

(Continued)

*Primary Examiner* — Giovanni Astacio-Oquendo
(74) *Attorney, Agent, or Firm* — Bejin Bieneman PLC

(57) ABSTRACT

A system includes a remote device, a client device, and a server. The server is configured to measure a signal strength of the client device relative to the server and transmit signal strength measurement data representing the signal strength. The remote device is configured to output a representation of the signal strength in accordance with the signal strength measurement data. A method includes measuring a signal strength of a client device relative to a server, transmitting signal strength measurement data representing the signal strength to a remote device, and outputting via the remote device a representation of the signal strength in accordance with the signal strength measurement data.

20 Claims, 3 Drawing Sheets

(51) Int. Cl.

| | | |
|---|---|---|
| *H04N 21/442* | (2011.01) | |
| *H04N 21/6547* | (2011.01) | |
| *H04B 17/318* | (2015.01) | |
| *H04N 21/658* | (2011.01) | |
| *H04B 17/20* | (2015.01) | |
| *H04N 5/44* | (2011.01) | |
| *H04B 17/23* | (2015.01) | |
| *H04B 17/24* | (2015.01) | |
| *H04B 17/27* | (2015.01) | |

(56) References Cited

U.S. PATENT DOCUMENTS

| | | | | |
|---|---|---|---|---|
| 7,242,176 | B2* | 7/2007 | Thomason | G01R 31/002 |
| | | | | 324/501 |
| 7,779,435 | B2* | 8/2010 | Nielsen | H04H 60/43 |
| | | | | 341/173 |
| 7,952,375 | B2* | 5/2011 | Eldridge | G01R 1/06711 |
| | | | | 324/754.03 |
| 8,996,421 | B2* | 3/2015 | Kahn | G06F 21/10 |
| | | | | 705/59 |
| 9,325,944 | B2* | 4/2016 | Kahn | H04N 5/765 |
| 2004/0058652 | A1 | 3/2004 | McGregor et al. | |
| 2010/0062756 | A1 | 3/2010 | Meloche et al. | |
| 2011/0244802 | A1 | 10/2011 | Kozlowski et al. | |
| 2013/0300643 | A1 | 11/2013 | Pedersen et al. | |
| 2017/0212882 | A1* | 7/2017 | Rollins | G06F 17/2715 |
| 2017/0236354 | A1* | 8/2017 | Baker | H04L 12/28 |
| | | | | 340/5.71 |
| 2018/0152544 | A1* | 5/2018 | Monczynski | H04L 67/40 |

OTHER PUBLICATIONS

Dube, Ryan; What Is DD-WRT and How It Can Make Your Router Into a Super-Router; Jul. 27, 2012, URL: http://www.makeuseof.com/tag/ddwrt-router-superrouter/; retrieved on Jun. 30, 2015 (8 pages).

* cited by examiner

SIGNAL MEASUREMENT USING PAIRED REMOTE DEVICE

BACKGROUND

In-home wireless networks permit consumers of media content to put networked media devices and associated display devices such as televisions in locations throughout their homes, including non-traditional locations. Prior to wireless networks, consumers were limited to putting televisions near a cable jack. Thus, consumers had to put the television near an existing cable jack or have a new cable jack installed, which can be costly. With the right wireless setup, however, a consumer can put a television in previously inaccessible locations (i.e., areas of the home that do not have nearby cable jack). The same applies to businesses as well. Wireless networks permits a business to put networked wireless devices in non-traditional locations without the expense of installing new cable jacks.

DETAILED DESCRIPTION

An exemplary system includes a remote device, a client device, and a server all communicating over a wireless network or networks. The server is configured to receive and measure the strength of a signal transmitted by the client device and transmit signal strength measurement data to the remote device. The remote device is configured to output and display a representation of the received signal strength. An exemplary method includes measuring a signal strength from a client device by a server, transmitting the signal strength measurement data to a remote device, and outputting or displaying, via the remote device, a representation of the signal strength.

The system and method allows a consumer or technician to measure and test the signal strength over a wireless communication network at a location in a home or business prior to installing a networked media device that needs a minimum signal strength to operate according to the consumer's expectations. The system shown in the FIGS. may take many different forms and include multiple and/or alternate components and facilities. The exemplary components illustrated are not intended to be limiting. Indeed, additional or alternative components and/or implementations may be used.

Figure 1:
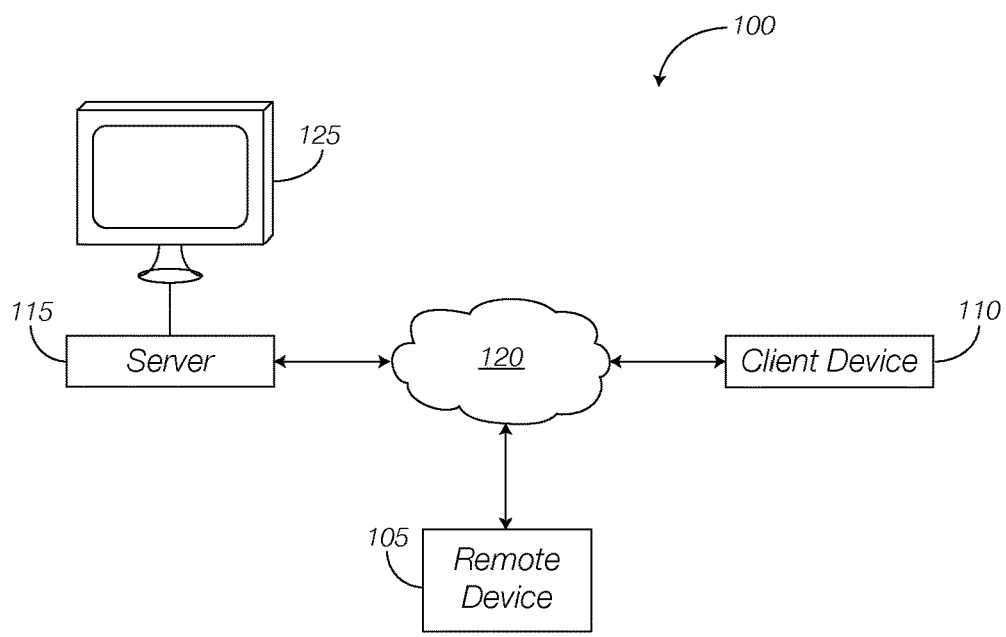
FIG. 1 illustrates an exemplary system to facilitate installation of networked devices.

As illustrated in FIG. 1, the system 100 includes a remote device 105, a client device 110, and a server 115. The client device 110 and the server 115 may be in communication over a communication network 120 in accordance with a communication protocol such as, e.g., WiFi. The remote device 105 may be in communication with the server 115, the client device 110, or both, according to the same or a different communication network 120 using the same or a different communication protocol such as Bluetooth®, Zigbee®, Z-Wave, or any other radio frequency-based communication protocol.

Figure 2A:
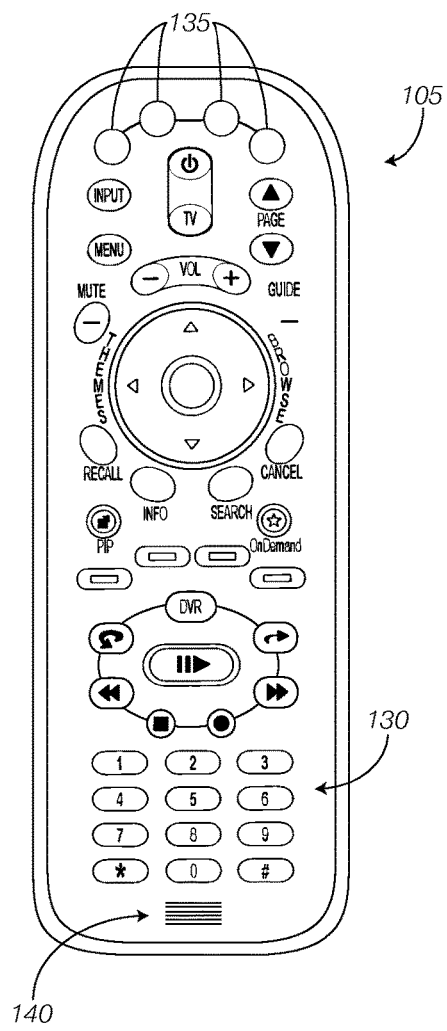
FIGS. 2A and 2B illustrate exemplary remote devices that may be used in the system of FIG. 1.
Figure 2B:
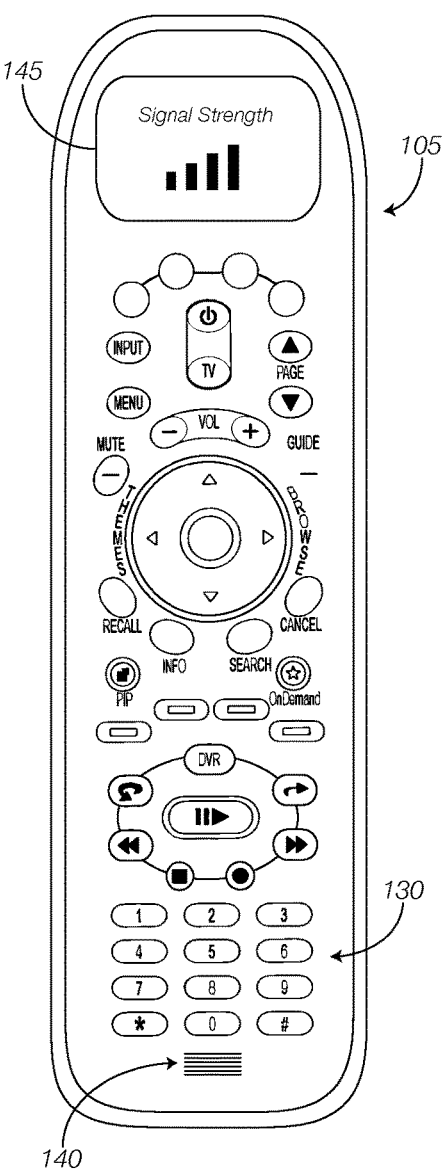

The remote device 105 may be configured to wirelessly control a paired electronic device such as a television, media player, theater system, set top box, or the like in accordance with a radio frequency communication protocol, an infrared communication protocol, or both. The remote device 105 may also be configured to control multiple paired electronic devices. For example, the remote device 105 may be configured to control a television when operating in a "television mode" and a set top box when operating in a "set top box mode." Moreover, the remote device 105 may be configured for two-way communication with any number of paired devices. That is, the remote device 105 may be configured to transmit signals to, and receive signals from, the server 115, the client device 110, or both. For instance, the remote device 105 may be configured to receive signal strength measurement data from the server 115. As discussed in greater detail below, when the remote device 105 is paired with the client device 110, the received signal strength measurement data may represent the signal strength received by the client device 110 as transmitted by the server 115. In one possible implementation, the remote device 105 may be incorporated into a remote control as shown in FIGS. 2A and 2B. Alternatively or in addition, the remote device 105 may operate as an application on a mobile device such as a mobile phone or tablet computer.

The client device 110 may be configured to pair and wirelessly communicate with the server 115, the remote device 105, or both. The client device 110 may be configured to output media content to, e.g., a display device such as a television (not shown in FIG. 1). Thus, the client device 110 may be configured to receive a data stream containing a media content instance, decode the data stream, and output the decoded data stream to the display device. In addition to the data stream, the client device 110 may be configured to receive other signals from the server 115. An example of another signal received from the server 115 may include signal strength measurement data, discussed in further detail below. In short, the signal strength measurement data may represent the signal strength of the wireless communication between the client device 110 and the server 115 as measured at the server 115 and at the client device 110.

The server 115 may be configured to receive a data stream representing a media content instance from a content provider server (not shown) over a content provider network, decode the data stream, and output the media content instance to a display device 125. Moreover, the server 115 may be configured to measure a signal strength of the client device 110 relative to the server 115, generate a signal strength measurement data representing the measured signal strength, and transmit the signal strength measurement data to the remote device 105, the client device 110, or both. The server 115 may transmit the signal strength to the remote device 105 if, e.g., the client device 110 does not have a way to present the signal strength to a user or the server device 110 does not have a way to present the signal strength to a user, or both. In response, the remote device 105 may output a representation of the received signal strength measurement data, to the user. Examples of how the remote device 105 may output the representation of the signal strength are discussed in greater detail below with reference to FIGS. 2A and 2B.

Referring now to FIG. 2A, the remote device 105 may include either mechanical or virtual buttons 130 and multiple lights 135, which may also serve as buttons. The buttons 130 may be configured to receive various user inputs. The lights 135 may be used to present various information to the user. For instance, the lights 135 may present the representation of the signal strength received from the client device 110 or the server 115. For instance, four lights 135 are shown in FIG. 2A. The number of lights 135 illuminated may relate to the received signal strength, which as discussed above may be the signal strength of the client device 110 relative to the server 115. When all four lights 135 are illuminated, the signal strength may be relatively high. Three illuminated lights 135 may indicate a sufficient signal strength. Two illuminated lights 135 may indicate a weak signal. One illuminated light may indicate a poor or unreliable signal. Zero illuminated lights 135 may indicate no signal strength. The remote device 105, as shown in FIG. 2A, may further include a speaker 140 configured to provide an audible indication of the signal strength. The audible indication may include a beep or other noise, and the frequency and tonal pitch of the beeping or noise may suggest the signal strength. For instance, the frequency and tonal pitch of the beeping may decrease as the signal strength declines. Accordingly, the representation of the signal strength may be an audible output, a visual output, or a combination of both.

An alternative remote device 105 is illustrated in FIG. 2B. In one possible approach, the remote device 105 may include a display screen 145 configured to display the signal strength as text or graphically. The text may include a number and associated units (e.g., decibels) representing the magnitude of one signal strength or multiple measured signal strengths. The graphical display may include an image representing the magnitude of one signal strength or multiple measured signal strength. The image shown in FIG. 2B includes bars of increasing size. An image with more bars suggests a stronger signal while fewer bars suggests a weaker signal. The display screen 145 may further present other information such as whether the remote device 105 is paired with the server 115 or the client device 110. In one possible implementation, the display screen 145 shown in FIG. 2B may instead be incorporated into a mobile device such as a cell phone or tablet computer.

Figure 3:
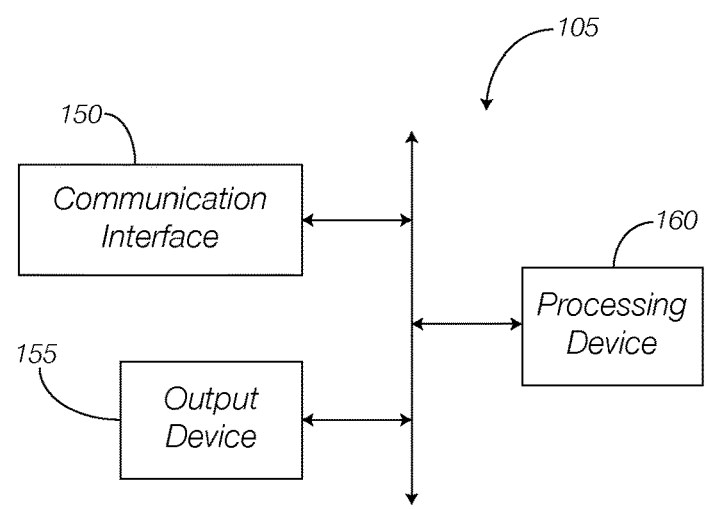
FIG. 3 is a block diagram showing exemplary components of the remote devices of FIGS. 2A and 2B.

FIG. 3 is a block diagram showing exemplary components of the remote device 105. As illustrated, the remote device 105 includes a communication interface 150, an output device 155, and a processing device 160.

The communication interface 150 may be configured to wirelessly communicate over the communication network 120 with the client device 110, the server 115, or both. Thus, the communication interface 150 may be configured to implement any number of wireless communication protocols, including protocols that permit the remote device 105 to pair and conduct two-way communication with the client device 110, the server 115, or both. The communication interface 150 may be configured to receive, e.g., the signal strength measurement data from either the client device 110 or from the server 115. As discussed above, the signal strength measurement data may represent the magnitude of the signal strength for communications between the server 115 and the client device 110 over the communication network 120.

The output device 155 may include an interface to an output device. Through the interface, the output device 155 may be configured to output the representation of the signal strength in accordance with the signal strength measurement data received from the communication interface 150. The output device 155, as discussed above, may include one or more lights 135 that, when illuminated, represent the signal strength. In the previous example described with respect to FIG. 2A, the number of illuminated lights 135 may relate to the signal strength. That is, four illuminated lights 135 may represent a strong signal while one illuminated light may represent a weak or unreliable signal. Alternatively, as shown in FIG. 2B, the output device 155 may include a display screen 145 configured to present text or a graphical representation of the signal strength. In either approach, the output device 155 may further include a speaker 140 configured to provide an audible representation of the signal strength.

The processing device 160 may be configured to process the signal strength measurement data received through the communication interface 150 and command the appropriate representation to be presented by the output device 155. For example, the processing device 160 may command one or more of the lights 135 to illuminate or for the signal strength or other graphical representation to be presented on the display screen 145.

Figure 4:
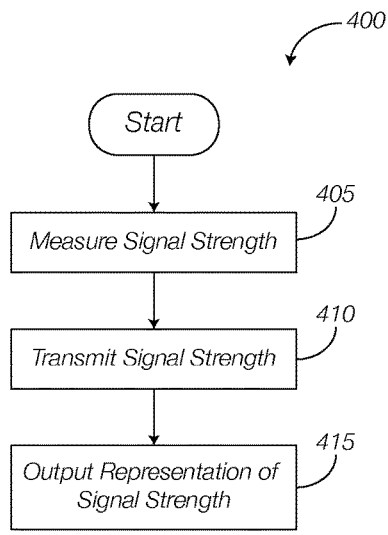
FIG. 4 is a flowchart of an exemplary process that may be implemented by one or more components of the system of FIG. 1.

FIG. 4 is a flowchart of an exemplary process 400 that may be implemented by one or more components of the system 100 of FIG. 1.

At block 405, the server 115 may measure the signal strength of the communications with the client device 110 over the communication network 120. The server 115 may take such measurements in real time and generate the signal strength measurement data representing the measured signal strength. Additionally or in the alternative, the client device 110 may measure the signal strength relative to the server 115.

At block 410, the server 115 or the server 115 may transmit the signal strength measurement data to the client device 110 or to the remote device 105 using any number of communication protocols. If the measurement taken at block 405 is of the signal strength between the client device 110 and the server 115, the server 115 or the client device 110 may transmit the signal strength measurement data to the remote device 105. If the measurement taken at block 405 is of the remote device 105 relative to the server, the server 115 may transmit the signal strength measurement data directly to the remote device 105 at block 410. Alternatively, the server 115 may transmit the signal strength measurement data to the client device 110 which may, in turn, transmit the signal strength measurement data to the remote device 105. The remote device 105 may receive the signal strength measurement data via, e.g., the communication interface 150 and process the signal strength measurement data using the processing device 160.

At block 415, the remote device 105 may output the representation of the signal strength measurement data received from either the client device 110 or the server 115. After the processing device 160 processes the signal strength measurement data, the processing device 160 may command the output device 155 of the remote device 105 to present the representation of the signal strength to the user. As discussed above, examples of the representation may include an audio output via the speaker 140 or a visual output via the lights 135 or display screen 145. After block 415, the process 400 may end or return to block 405 so that the signal strength may be updated.

Figure 5:
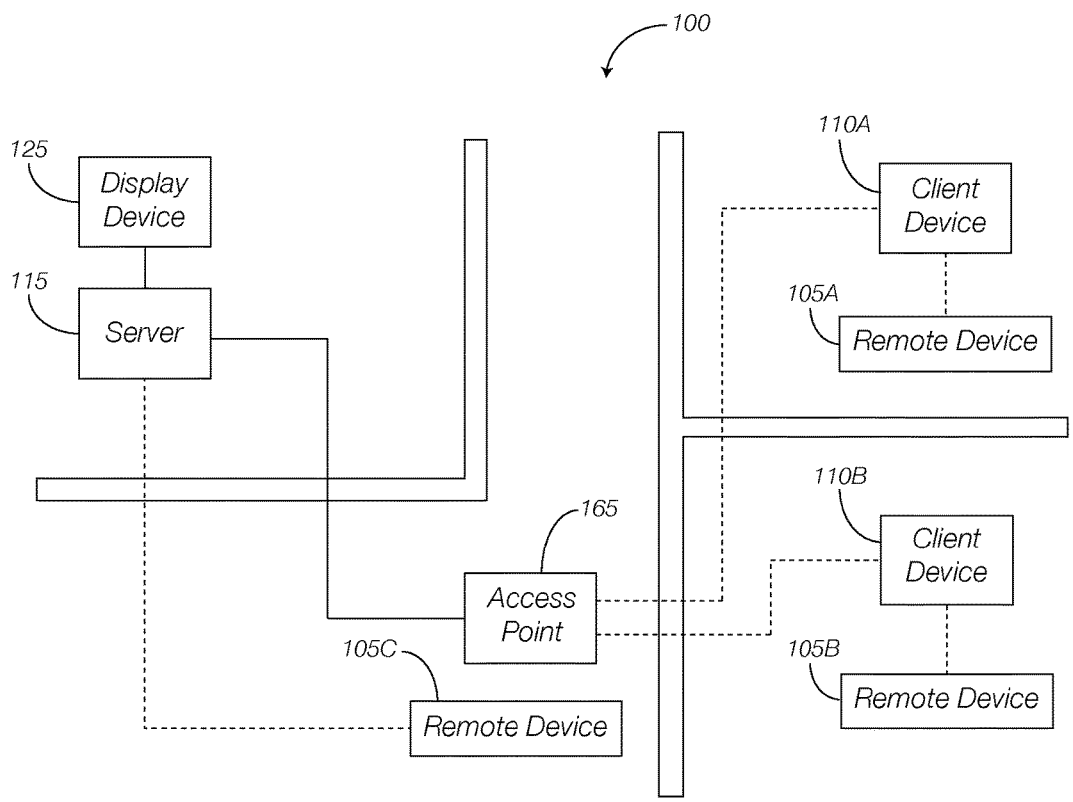
FIG. 5 illustrates one possible implementation of the system of FIG. 1.

Referring now to FIG. 5, the system may include a first remote device 105A, a second remote device 105B, a third remote device 105C, a first client device 110A, a second client device 110B, server 115, and an access point 165. As illustrated, the server 115 is connected to display device 125, and the mobile access point 165 may be hardwired to the server 115. The access point 165 may act as the wireless transmitter for the server 115. Sometimes it may be necessary to locate the access point 165 in another room away from the server 115, out of view of the display device 125, to improve the signal link between the access point 165 and the clients 110A and 110B. The signal at the access point 165 may represent the reception quality from all clients 110 and 110B. However, it is inconvenient for a technician or user to return to the room with the display device 125 every time he or she moves the access point 165 position to improve signal reception. Furthermore, it is likely not economical to add another display to the access point 165 specifically for this one-time function. Therefore, the remote device 105C can be used as a signal meter for the access point 165. The remote device 105C may receive signal readings from the server 115 via an RF link. The server 115 may receive signal readings from the access point 165 over the hard wired connection. The client devices 110A and 110B may be located in rooms without a display device since signal reception for those rooms has not yet been verified and it is likely not economical to include display functionality to the client devices 110A and 110B for this one-time purpose. Nevertheless, the remote devices 105A and 105B linked to the client devices 110A and 110B, respectively, may serve as signal meters to indicate signal reception at the individual clients 110A and 110B. Thus, the remote devices 105A and 105B can be used to select individual locations of the client devices 110A and 110B relative to the location of the access point 165, since the signal strength measurement data associated with each client device 110A and 110B may be different than the access point aggregate signal reading.

Accordingly, the remote devices 105A, 105B, and 105C may act as mobile meters that can travel with the client devices 110A and 110B and access point 165 without the need for TV displays, enabling real-time positioning of these devices 110A, 110B, and 165 in response to signal indications available at each. Thus, the client devices 110A and 110B and the access point 165 can be installed at locations that maximize signal reception. Moreover, using the remote devices 105A, 105B, and 105C in this way can significantly reduce installation time and cost while also avoiding the need to add signal indications to the access point 165 and client devices 110A and 110B.

In an example where the client device 110B has good signal reception and the client device 110A has poor signal reception, The remote devices 105A and 105C may show a representation of a poor signal, while the remote device 105B may show a representation of a good signal. The signal reception of the client device 110A and the access point 165 can be improved multiple ways. One way to improve the signal reception may be to move the client device 110A closer to the access point 165 until the signal strength as indicated on the remote device 105A improves. Another way to improve the signal reception may be to move the access point 165 closer to the client device 110A until the remote device 110A represents a stronger signal strength. Moving the access point 165, however, may impact the signal strength at client device 110B. Therefore, after the access point 165 is moved, the signal strength at client device 110B as presented on the remote device 105B may need to be reevaluated. Accordingly, this approach provides information that can be used to triangulate the best position of all wireless nodes to maximize signal reception. It may also be possible to read out any signal from any remote device 105A, 105B, and 105C, and thus this could be simplified into a cloud of various RF or other wireless communication links. In another implementation, all signal strengths could be transmitted to a single remote device 105 such as a tablet or smart phone, where all three signal strength measurements could be displayed at one time, enabling the effects of repositioning the access point 165 and client devices 110 on the various signal strengths to be observed at one time and used to optimize the positioning of these devices 165 and 110 for maximum signal reception.

In general, computing systems and/or devices may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
a remote device;
a client device paired with the remote device; and
a server configured to measure a signal strength of the client device relative to the server and transmit signal strength measurement data to at least one of the client device and the remote device,
wherein the remote device is configured to receive the signal strength measurement data transmitted from at least one of the server and the client device and output a representation of the signal strength of the client device in accordance with the signal strength measurement data received at the remote device.

2. The system of claim 1, wherein the remote device includes a plurality of lights, and wherein the remote device is configured to output the representation of the signal strength of the client device by illuminating at least one of the plurality of lights to represent the signal strength of the client device.

3. The system of claim 1, wherein the remote device includes a display screen, and wherein the remote device is configured to display the representation of the signal strength on the display screen.

4. The system of claim 1, wherein the remote device is configured for two-way communication with at least one of the client device and the server.

5. The system of claim 1, wherein the client device is configured to wirelessly communicate with the server.

6. The system of claim 1, wherein the remote device is configured to wirelessly communicate with at least one of the client device and the server.

7. The system of claim 1, wherein the remote device is configured to pair with the server.

8. The system of claim 1, wherein the client device is configured to receive the signal strength measurement data from the server and transmit the signal strength measurement data to the remote device.

9. The system of claim 1, wherein the remote device is configured to receive the signal strength measurement data from the server.

10. The system of claim 1, wherein the representation of the signal strength of the client device includes at least one of a visual output and an audio output.

11. A remote device comprising:
a communication interface configured to pair with a client device and receive signal strength measurement data from at least one of the client device and a server, the signal strength measurement data representing a signal strength of the client device relative to the server;
a processing device configured to process the signal strength measurement data; and
an output device configured to receive the signal strength measurement data from the processing device and output a representation of the signal strength of the client device in accordance with the signal strength measurement data received.

12. The remote device of claim 11, wherein the output device includes a plurality of lights, and wherein outputting the representation of the signal strength of the client device includes illuminating at least one of the plurality of lights.

13. The remote device of claim 11, wherein the output device includes a display screen, and wherein the representation of the signal strength of the client device is displayed on the display screen.

14. The remote device of claim 11, wherein the communication interface is configured for two-way communication with at least one of the client device and the server.

15. The remote device of claim 11, wherein the communication interface is configured for wireless communication with at least one of the client device and the server.

16. The remote device of claim 11, wherein the communication interface is configured to pair with at least one of the server and the client device to receive the signal strength measurement data.

17. The remote device of claim 11, wherein the output device is configured to output the representation of the signal strength of the client device as at least one of a visual output and an audio output.

18. A method comprising:
measuring a signal strength of a client device relative to a server;

transmitting signal strength measurement data representing the signal strength of the client device to a remote device paired with the client device; and outputting, via the remote device, a representation of the signal strength of the client device in accordance with the signal strength measurement data.

19. The method of claim 18, wherein the signal strength of the client device is received from at least one of the client device and the server.

20. The system of claim 1, further comprising an access point hard-wired to the server and in wireless communication with the client device, wherein the signal strength measurement data represents a wireless signal strength of the client device relative to the access point hard-wired to the server and wherein the signal strength of the client device relative to the server is based at least in part on the wireless signal strength of the client device relative to the access point hard-wired to the server.

\* \* \* \* \*